Aug. 27, 1929.　　　O. E. CLARK　　　1,726,287
CLUTCH MECHANISM
Filed Feb. 13, 1926　　　4 Sheets-Sheet 2
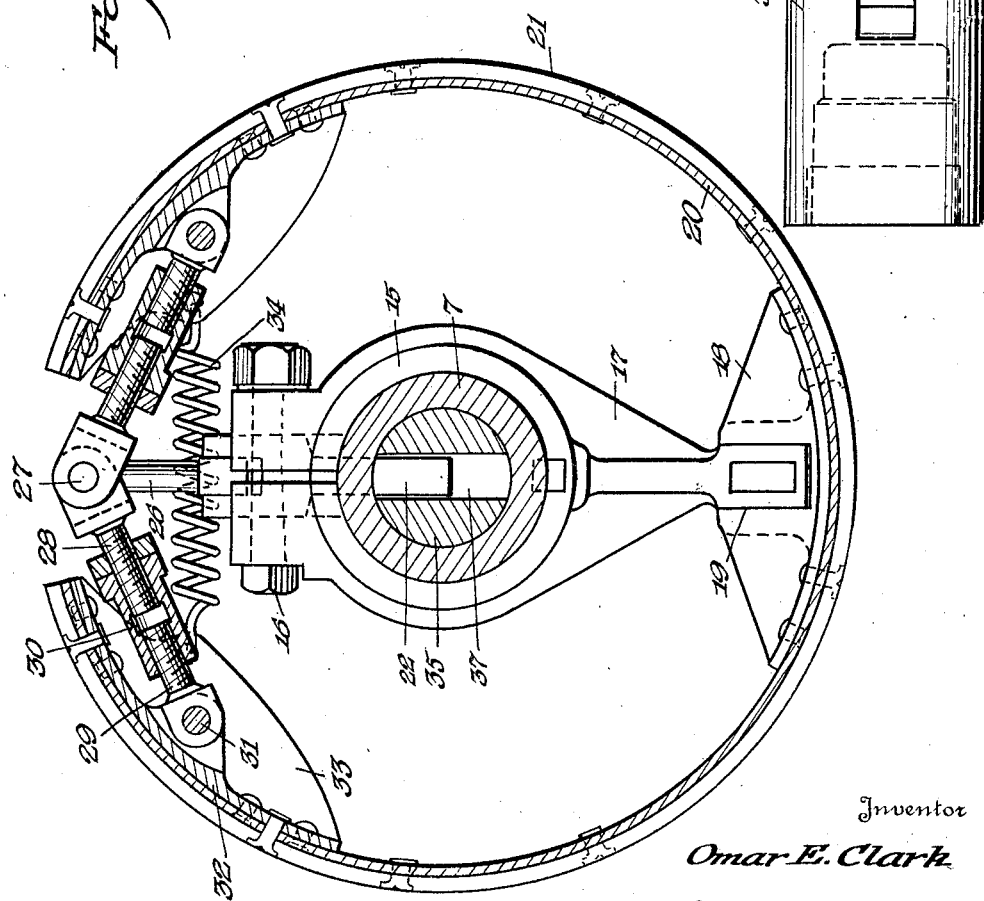
Inventor
Omar E. Clark
By
Attorney.

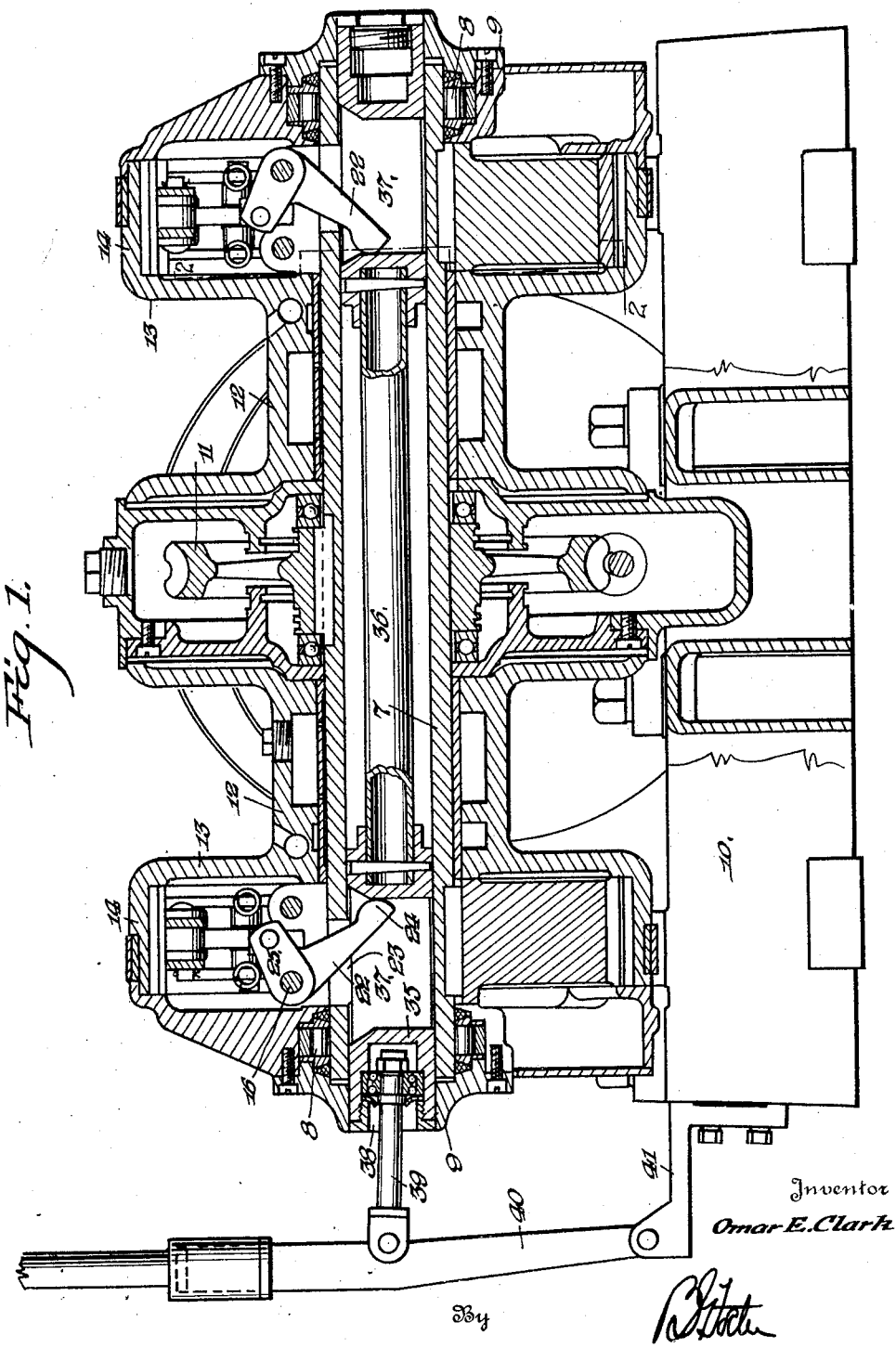

Aug. 27, 1929.　　O. E. CLARK　　1,726,287
CLUTCH MECHANISM
Filed Feb. 13, 1926　　4 Sheets-Sheet 3

Inventor
Omar E. Clark

Aug. 27, 1929.  O. E. CLARK  1,726,287
CLUTCH MECHANISM
Filed Feb. 13, 1926  4 Sheets-Sheet 4

Inventor
Omar E. Clark
By
Attorney

Patented Aug. 27, 1929.

1,726,287

UNITED STATES PATENT OFFICE.

OMAR E. CLARK, OF DENVER, COLORADO, ASSIGNOR, BY MESNE ASSIGNMENTS, TO THE GARDNER-DENVER COMPANY, OF QUINCY, ILLINOIS, A CORPORATION OF DELAWARE.

CLUTCH MECHANISM.

Application filed February 13, 1926. Serial No. 88,074.

The present invention relates to clutch mechanism, and is in part a continuation of an application for patent on hoists, Serial No. 30,729, filed May 16, 1925.

The object is to provide novel self-contained and completely housed mechanism of a simple and effective character that is compact, thus making it peculiarly effective for hoists or the like that are used in confined places, such as mines, and have to be transported from place to place.

In the accompanying drawings:

Figure 1 is a vertical longitudinal sectional view through a hoist, in which the clutch mechanism is employed, which hoist is fully illustrated in the aforesaid application, Serial No. 30,729.

Figure 2 is a vertical cross sectional view through one of the clutch mechanisms, and taken on the line 2—2 of Figure 1.

Figure 3 is a detail view of one of the plunger heads,

Figure 4:
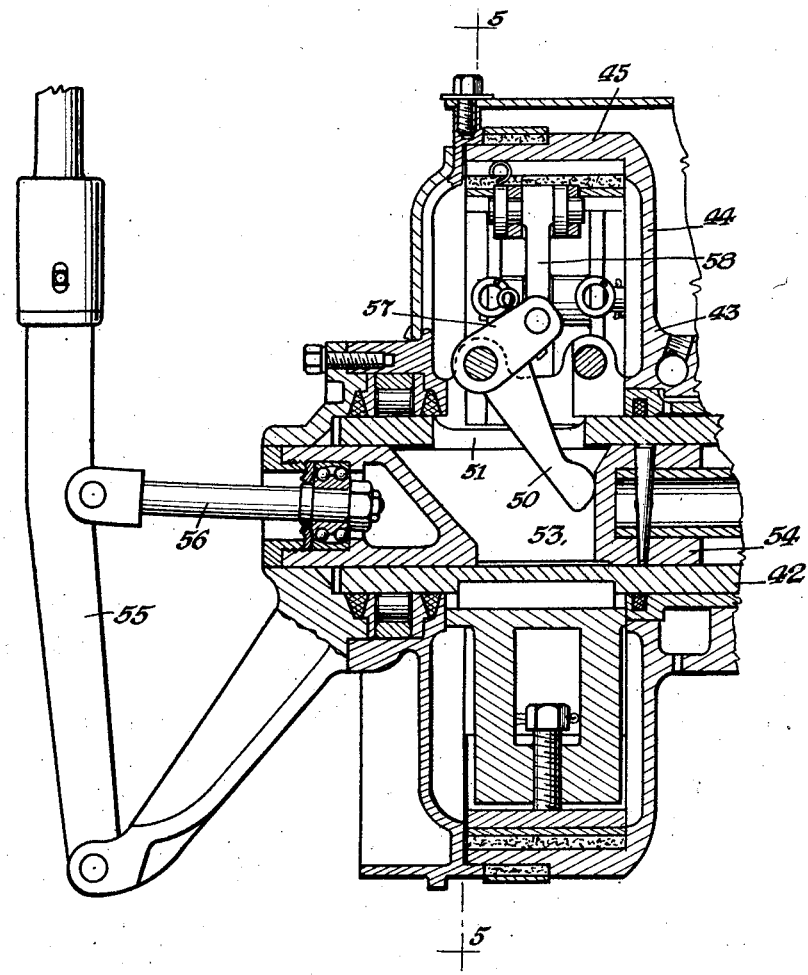
Figure 4 is a longitudinal sectional view of a preferred embodiment of the invention involving certain additional details of construction.

Referring first to the embodiment illustrated in Figures 1, 2 and 3, there is illustrated a rotatable tubular driving shaft 7, suitably mounted in bearings 8. These bearings are located in supporting brackets 9 that are mounted on a base 10. The shaft has fixed to its central portion a driving worm gear 11 driven by a suitable motor, as fully disclosed in the aforesaid application. Loosely journaled on the shaft 7 and located on opposite sides of the worm gear 11 are two winding drums 12. Each of these winding drums has outer heads 13 provided with outstanding peripheral flanges 14. The inner faces of these flanges constitute annular clutch surfaces adapted to be engaged by clutch mechanisms carried by the tubular shaft 7. Inasmuch as the clutch mechanisms are duplicates, a description of one will be sufficient for both.

Fixed to the shaft 7 and arranged within the flange 14 of the drum 12 is a split collar 15, the ends of which are connected by contracting bolts 16. The collar is provided on the side diametrically opposite to the bolts 16 with an outstanding arm 17. A bracket 18 is provided with a socket 19 in which the free end of the arm 17 is slidably received, and secured to this bracket is the central portion of an expansible and contractile clutch ring 20, the free ends of which are located outside the split side and contracting bolts 16 of the collar 15. The ring, as usual, is provided with a friction band 21.

Journaled on one of the clamping bolts 16 is a bell crank lever, one arm 22 of which extends through a slot 23 in the driving shaft 7, and is provided at its inner end with a rounded head 24. The other arm 25 of the bell crank has connected thereto a link 26, to which are pivoted, as shown at 27, the inner ends of toggle links. These toggle links comprise threaded sections 28 and 29 connected by a threaded adjusting sleeve 30. The links 29 are pivoted, as shown at 31, to the inner sides of the end portions of the clutch ring by means of brackets 32 secured to said ends. The brackets have inwardly extending flanges 33 on opposite sides of the toggles, and the flanges of the opposite brackets are connected by coiled contracting springs 34.

A reciprocatory plunger is located in the bore of the driving shaft 7 and consists of a pair of heads 35 connected by a stem 36 of less diameter than the heads. These heads have sockets 37 in which the arms 22 of the bell cranks are engaged, the two arms preferably inclining inwardly and being in bearing engagement with the inner end walls of said sockets. The outer ends of the plunger heads are also socketed as shown at 38, and extending into one of said heads and having a rotary connection with the head is a link 39 that is connected to an operating lever 40, fulcrumed at its lower end on a bracket 41 that is secured to the base 10. The structure is such that this bracket can be placed at either side of the base and the link 39 connected to either head.

With this construction, it will be evident that if the lever 40 is moved in one direction, as for example, to the left in Figure 1, the left hand bell crank 22 will be swung outwardly while the corresponding right hand bell crank will be allowed to move a limited distance in the same direction.

The movement of the left hand bell crank will cause a downward movement of the other arm 25 of the bell crank, and as will be evident by reference to Figure 2 the link 26 will be swung downwardly, the toggle straightened out and the clutch ring expanded into clutching engagement with the surrounding flange of the drum 12. Consequently said drum will be clutched to the shaft 7, while the other drum remains loose. Upon a reverse movement the clutch drum will be released while the other clutch will be thrown into operation to clutch the other drum to the shaft. When the parts are in an intermediate position as shown in Figure 1, both drums will be released.

In these clutching actions it has been found that the particular arrangement of the toggle is advantageous when it is pulled inwardly to cause the expansion of the ring for the reason that it not only expands the ends of the ring, but it exerts a force outwardly against the central portion, causing a very complete expansion and clutching action at all points against the flange. The amount of movement of the toggle can be varied by lengthening or shortening the links thereof. For instance, it may be permitted to have a movement to bring the links into alinement or slightly past the dead center so as to cause the automatic locking of the clutch.

Figure 5:
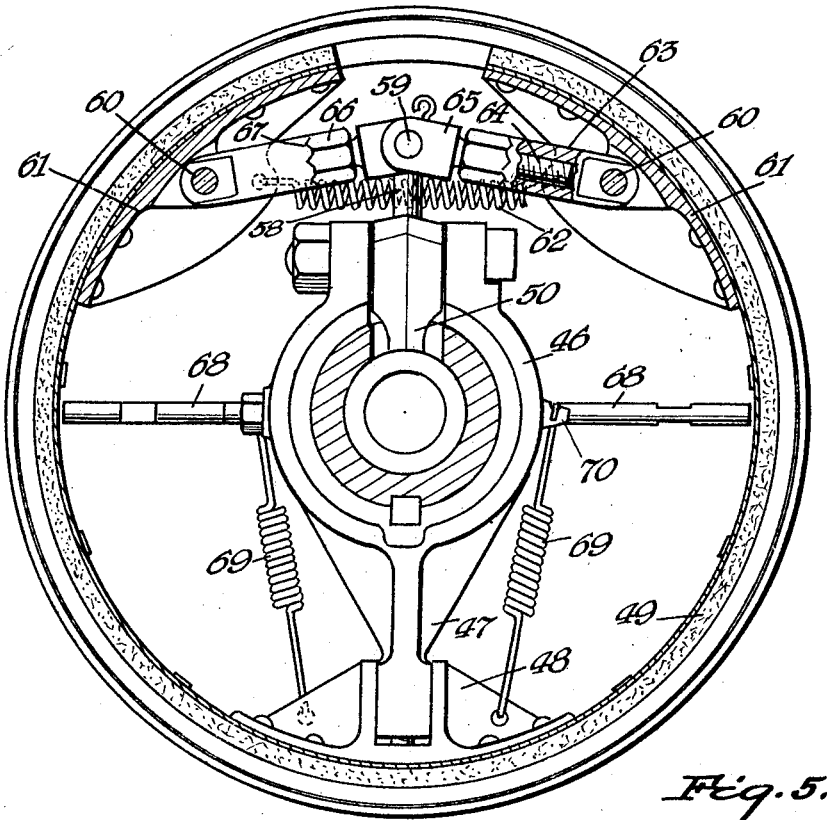
Figure 5 is a sectional view substantially on the line 5—5 of Figure 4, and showing the clutch mechanism in its released position.
Figure 6:
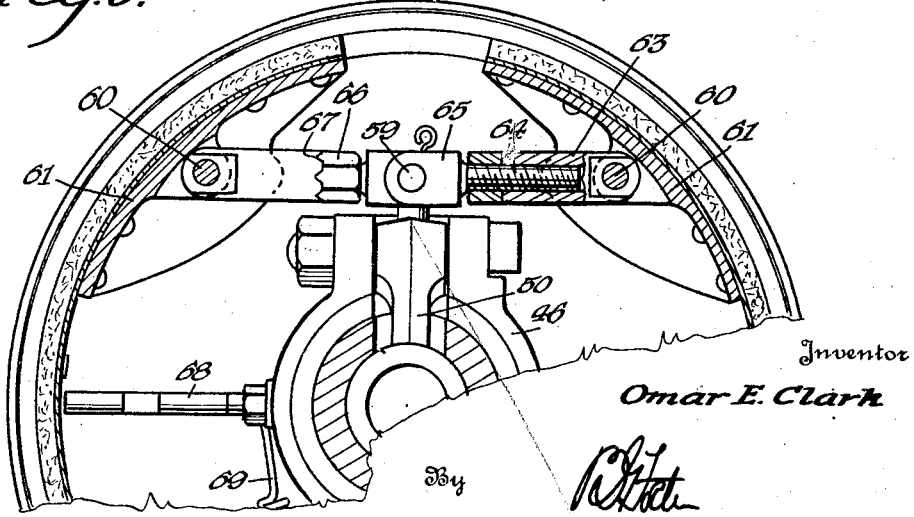
Figure 6 is a view similar to Figure 5, but showing the clutch mechanism in its operative or clutching condition.

A slightly modified form of construction and one involving certain detail improvements that tend to add to its effectiveness is shown in Figures 4, 5 and 6. The tubular shaft is designated 42, a portion of the drum is shown at 43, and has a head 44 carrying an outstanding clutch flange 45. The collar, secured to the head, is illustrated at 46, and has an arm 47 on which the central bracket 48 of the clutch ring 49 is mounted. The inwardly extending arm 50 of the operating bell crank extends through a slot 51 in the shaft 42, and is engaged in the socket 53 of the head 54 of the plunger, as already described. This plunger is actuated by a lever 55 having a link connection 56 with the plunger head. The other arm 57 of the bell crank has a link connection 58 with a pivot 59 engaged in the inner ends of the toggle links, the outer ends of said toggle links being pivoted as shown at 60 to the brackets 61 secured to the ends of the clutch ring. Springs 62 serve to draw the ends of said ring toward each other. The toggle links, it will be noted in this embodiment, consist of outer sleeves 63 in which are slidably mounted threaded stems 64 having heads 65 in which the pivot 59 is engaged. Adjusting nuts 66 are threaded upon the stems 64 and have bearings against the inner ends of the sleeves 63. These bearings may be in the form of lugs and notches 67, which serve to normally prevent the rotation of the nuts. When a wrench is applied to the nuts they may be turned, however, and thus the links lengthened or shortened.

In this construction furthermore the collar 46 is preferably provided with diametrically opposite outstanding guide pins 68, the outer ends of which are adjacent to the inner sides of the clutch ring midway between its central mounting and its ends. There are also preferably provided coiled return springs 69 having their outer ends connected to the central bracket 48 and their inner ends secured to lugs 70 formed upon opposite sides of the collar 46.

From the foregoing, it is thought that the construction, operation and many advantages of the herein described invention will be apparent to those skilled in the art, without further description, and it will be understood that various changes in the sizes, shape, proportion and minor details of construction, may be resorted to without departing from the spirit of sacrificing any of the advantages of the invention.

What I claim, is:—

1. In clutch mechanism, the combination with a shaft and a rotary member surrounding the same and having an internal annular clutch face, of a head on the shaft within the rotary member and having an arm on one side and a mounting element on the opposite side, a clutch ring within the face having a socketed bracket at its central portion and within the rotary member that loosely receives the free end of the arm, toggle links connecting the ends of the ring and angled outwardly when the ring is contracted, and a bell crank fulcrumed on the mounting element of the head within the rotary member and connected to the toggle links for moving the toggle links inwardly to expand the ring into engagement with the clutch face.

2. In clutch mechanism, the combination with a rotary driving member and a rotary driven member, one of said members having a clutch surface, of an expansible and contractile clutch ring mounted on the other member and movable into and out of engagement with the clutch surface, a toggle connecting the ends of the ring to spread them apart and thereby expand the ring, means for causing the toggle to move inwardly toward the axis of rotation of the members to cause said expansion of the ring, said toggle comprising pivotally connected links, each link consisting of a sleeve, a stem slidable in the sleeve, and an adjusting nut threaded on the stem, bearing against the sleeve and having means interlocking with the sleeve to prevent its accidental rotation on the stem.

3. In clutch mechanism, the combination with a shaft, of a rotary member having an internal annular friction face, of a collar fixed to the shaft and having an outstanding arm, an expansible ring having a central bracket and terminal brackets, said central bracket having a sliding mounting on the outer end of the arm, toggle links connected to the terminal brackets for spreading the arms, an actuating device pivoted on the collar for operating the toggle links, and a spring connection between the terminal brackets for resisting their separation by the toggle links.

4. In clutch mechanism, the combination with a rotary member and a second rotary member surrounding the same and having an internal annular clutch face, of a head on the first rotary member located wholly within the second member, said head having an arm on one side and a mounting member on its opposite side, both housed by the first member, an expansible clutch ring within the second member loosely mounted at its central portion on the arm, and means movably supported on the mounting member for expanding the ring, said means being housed within the second member and being in the space bounded by the annular clutch face and the clutch ring.

In testimony whereof, I affix my signature.

OMAR E. CLARK.